UNITED STATES PATENT OFFICE.

GUSTAV SPIESS AND ADOLF FELDT, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

SALTS OF THE AUROTHIOSULFURIC ACID AND PROCESS OF MAKING SAME.

1,115,610.   Specification of Letters Patent.   Patented Nov. 3, 1914.

No Drawing.   Application filed January 16, 1914. Serial No. 812,577.

*To all whom it may concern:*

Be it known that we, GUSTAV SPIESS, Ph. D., professor of medicine, and ADOLF FELDT, Ph. D., doctor of medicine, citizens of the Empires of Germany and Russia, respectively, residing at Frankfort-on-the-Main, Germany, have invented certain new and useful Improvements in Salts of the Aurothiosulfuric Acid and Processes of Making Same, of which the following is a specification.

In U. S. Patent-application Ser. No. 812,575 filed January 16, 1914 is described the process of preparing double-salts of gold-hydrocyanic acids with organic nitrogenous bases. Now we have found that in the place of the gold hydrocyanic acids there may also be used aurothiosulfuric acid or its salts. The products thus obtained possess the same properties regarding their action upon microörganisms in the animal body as those claimed in the aforesaid U. S. patent application.

The process of preparing said new products consists in treating the organic bases or their salts with aurothiosulfuric acid or its salts, and may be illustrated by the following examples:

*Example I:* 1.5 grams of the hydrochlorid of ethylenediamin and 3.7 grams of sodium aurothiosulfate are dissolved each in 10 cc. of water. The two solutions are mixed and after standing for some time 200 cc. of absolute alcohol are added. The yellowish crystalline mass which separates is purified by dissolving it in a little quantity of water whereupon the solution is filtered and precipitated with absolute alcohol. If necessary, the purifying operation may be repeated. The pure ethylenediamin aurothiosulfate forms a white crystalline powder, very readily soluble in water and difficultly soluble in alcohol. Its salt begins to turn yellow at about 150° C. and when heated to a higher temperature decomposes with evolution of sulfur dioxid; finally there remains pure gold. The preparation contains a percentage of gold corresponding to the formula:

In an analogous manner are prepared the auro-thiosulfates of other organic bases.

*Example II:* To a solution of 2.86 grams of piperazin-sulfate in 15 cc. of water is added a solution of 5.2 grams of barium aurothiosulfate in 50 cc. of water. After having allowed the mixture to stand for one hour, the barium sulfate which has separated is filtered off and from the filtrate the auric double-salt is precipitated by means of absolute alcohol. For purifying the salt, it is dissolved in as little water as possible and precipitated with acetone. The piperazin-aurothiosulfate forms a colorless crystalline powder which assumes a somewhat dark coloration at about 160° C. and, when heated to a higher temperature, decomposes without previously melting. It is very readily soluble in water; the percentage of gold contained therein corresponds to the formula:

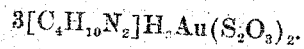

*Example III:* 2.2 grams of barium aurothiosulfate are dissolved in 15 cc. of water and mixed with a solution of 3.5 grams of 1-phenyl-2.3-dimethyl-4-dimethylamino-5-pyrazolone sulfate in 25 cc. of water. The barium-sulfate which separates at once is filtered off and the clear, colorless filtrate is evaporated to dryness. For removing from the residue the adhering oily substances, the mass is pressed upon a clay-slate. The 1-phenyl-2.3-dimethyl-4-dimethylamino-5-pyrazolone aurothiosulfate forms nice, colorless crystals, melting at 105–107° C. It dissolves very readily in water; the percentage of gold contained therein corresponds to the formula:

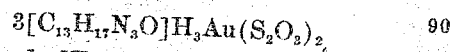

*Example IV:* 2.2 grams of barium-aurothiosulfate are dissolved in 25 cc. of water and mixed with a solution of 2 grams of cholin-sulfate in 25 cc. of water. The barium sulfate which separates is filtered off and the filtrate is evaporated, as far as possible, in a vacuum-exsiccator over phosphorus pentoxid, when a small quantity of a crystalline body separates which is probably formed by decomposition during the evaporation, and which is insoluble in water. The crystals are carefully filtered off and the clear, thin, oily liquid is mixed with much absolute alcohol. When this mixture is rubbed for a considerable time a portion of the oily liquid solidifies into a powdered, white mass which constitutes the new body, namely the cholin-aurothiosulfate which is an extremely hygroscopic body dissolving in water with neutral reaction.

Having now described our invention, what we claim is—

1. The process of preparing salts of the aurothiosulfuric acid with organic nitrogenous bases, which consists in treating the aurothiosulfuric acid with such an organic base.

2. As new products, salts of the aurothiosulfuric acid with organic nitrogenous bases, corresponding to the formula:

$$3BNH_3Au(S_2O_3)_2,$$

wherein BN stands for an organic, nitrogenous base, and $H_3Au(S_2O_3)_2$ for the aurothiosulfuric acid, being colorless crystals, dissolving in water without decomposition, scarcely soluble in ether and benzene, and decomposing, when heated, leaving metallic gold.

3. As a new product, the aurothiosulfate of 1-phenyl-2.3-dimethyl-4-dimethylamino-5-pyrazolone of the constitution:

$$3[C_{13}H_{17}N_3O]H_3Au(S_2O_3)_2,$$

being colorless crystals, readily dissolving in water without decomposition, scarcely soluble in ether and benzene and decomposing, when heated, leaving metallic gold.

In testimony whereof, we affix our signatures in presence of two witnesses.

GUSTAV SPIESS.
ADOLF FELDT.

Witnesses:
JEAN GRUND,
CARL GRUND.